(12) United States Patent
Karthikesan

(10) Patent No.: US 8,732,718 B2
(45) Date of Patent: May 20, 2014

(54) TECHNIQUES TO AUTOMATICALLY CLASSIFY PROCESSES

(71) Applicant: Novell, Inc., Provo, UT (US)

(72) Inventor: Nikanth Karthikesan, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/755,585

(22) Filed: Jan. 31, 2013

(65) Prior Publication Data

US 2013/0145370 A1   Jun. 6, 2013

Related U.S. Application Data

(63) Continuation of application No. 13/008,177, filed on Jan. 18, 2011, now Pat. No. 8,375,394.

(51) Int. Cl.
*G06F 9/46* (2006.01)

(52) U.S. Cl.
USPC ........................................................ 718/104

(58) Field of Classification Search
None
See application file for complete search history.

(56) References Cited

U.S. PATENT DOCUMENTS

| 6,038,677 | A | * | 3/2000 | Lawlor et al. ................. 714/4.1 |
| 6,154,787 | A | | 11/2000 | Urevig et al. |
| 6,374,984 | B1 | | 4/2002 | Nagler |
| 7,480,712 | B2 | | 1/2009 | Moy |
| 7,689,610 | B2 | * | 3/2010 | Bansal et al. .......... 707/999.006 |
| 7,787,399 | B2 | | 8/2010 | Chu et al. |
| 2008/0086551 | A1 | * | 4/2008 | Moy ............................ 709/223 |
| 2010/0074446 | A1 | | 3/2010 | Fuchs et al. |
| 2010/0268712 | A1 | | 10/2010 | Ngwije |
| 2012/0185857 | A1 | | 7/2012 | Karthikesan |

OTHER PUBLICATIONS

"Oracle Database Performance Tuning Guide 10g Release 2 (10.2)", http://downloadoracle.com/docs/cd/B19306_01/server.102/b14211.pdf, B14211-03, (Mar. 2008), 474 pages.
"The Automatic Workload Repository (AWR)", http://www.toadworld.com/KNOWLEDGE/KnowledgeXpertforOracle/tabid/648/TopicID/CMI2/Default.aspx, (Copryright 2010).
Alapati, Sam R, "Common Manageability Infrastructure", Expert Oracle Database 11g Administration, (2009), 210-211.

* cited by examiner

*Primary Examiner* — Emerson Puente
*Assistant Examiner* — Sisley Kim
(74) *Attorney, Agent, or Firm* — Schwegman, Lundberg & Woessner, P.A.

(57) ABSTRACT

Techniques for automatically classifying processes are presented. Processes executing on a multicore processor machine are evaluated to determine shared resources between the processes, excluding shared system resources. A determination is then made based on the evaluation to group the processes as a single managed resource within an operating system of the multicore processor machine.

16 Claims, 3 Drawing Sheets

TECHNIQUES TO AUTOMATICALLY CLASSIFY PROCESSES

RELATED APPLICATIONS

The present Application is a continuation of, claims priority to, and is co-pending with U.S. patent application Ser. No. 13/008,177; entitled: "Techniques to Automatically Classify Processes," filed on Jan. 18, 2011 and which presently stands allowed as U.S. Pat. No. 8,375,394 and is scheduled to issue on Feb. 12, 2013; the disclosure of which is incorporated by reference in its entirety herein.

BACKGROUND

Technology advancements in recent years have permitted processes to operate in multicore processor environments. So, multiple processes are capable of executing in parallel on a single machine architecture that includes multiple independent processors.

Multicore operating systems generally treat a process as a single application and then manage system resources between other applications of the operating system. However, more and more applications are actually made up of many independent sub-processes that work together. Thus, treating "N" processes from a single application as "N" different applications and only sharing the common system resources between the applications leads to unfair resource allocation and creates a situation where some applications are potentially unnecessarily starved for processing resources.

Linux-based operation systems offer a partial solution to the above-noted problem by permitting applications to be grouped together and assigned a certain predefined percentage of processing resources. Yet, the Linux-based solution requires a manual intervention to group processes together. That is, the Linux operating system does not automatically handle grouping processes together. Moreover, when a process is manually grouped, any sub-process that is forked off from the grouped process automatically becomes part of the group to which the grouped process belongs. This is may not be what an administrator intended to occur when the grouped process was initially grouped.

Therefore, what is needed is a technique to automatically group processes together without manual intervention for purposes of sharing non-system resources between the grouped processes.

SUMMARY

Techniques for automatically classifying processes are presented. More particularly, and in an embodiment, a method for automatically classifying processes is described.

More particularly, a first process and a second process are detected as executing on a multicore processor machine based on resources being used by the first process and the second process. Next, metrics for the first process and the second process are gathered based on the resources. Then, the metrics are compared against one or more threshold values that exclude those resources that are shared system resources shared between the first process and the second process. Finally, a determination is made as to whether to group the first process and the second process together within an operating system of the multicore process machine when the metrics are above or equal to the one or more threshold values.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

As used herein, unless noted otherwise, a "resource" can be a physical hardware resource (e.g., memory, storage, processor, communication port, etc.) and/or a software resource (e.g., library, service, etc.).

Various embodiments of this invention can be implemented in existing operating architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured and programmed to specifically perform the processing of the methods and systems presented herein, Moreover, the methods and systems are implemented, reside, and are programmed within a non-transitory computer-readable storage media or machine-readable storage medium and are processed on the machines configured to perform the methods. Also, as used herein, a "machine" refers to a physical computing device, such as a "multicore processor machine."

Of course, the embodiments of the invention can be implemented in a variety of architectural platforms, devices, operating and server systems, and/or applications. Any particular architectural layout or implementation presented herein is provided for purposes of illustration and comprehension only and is no intended to limit aspects of the invention.

Figure 1:
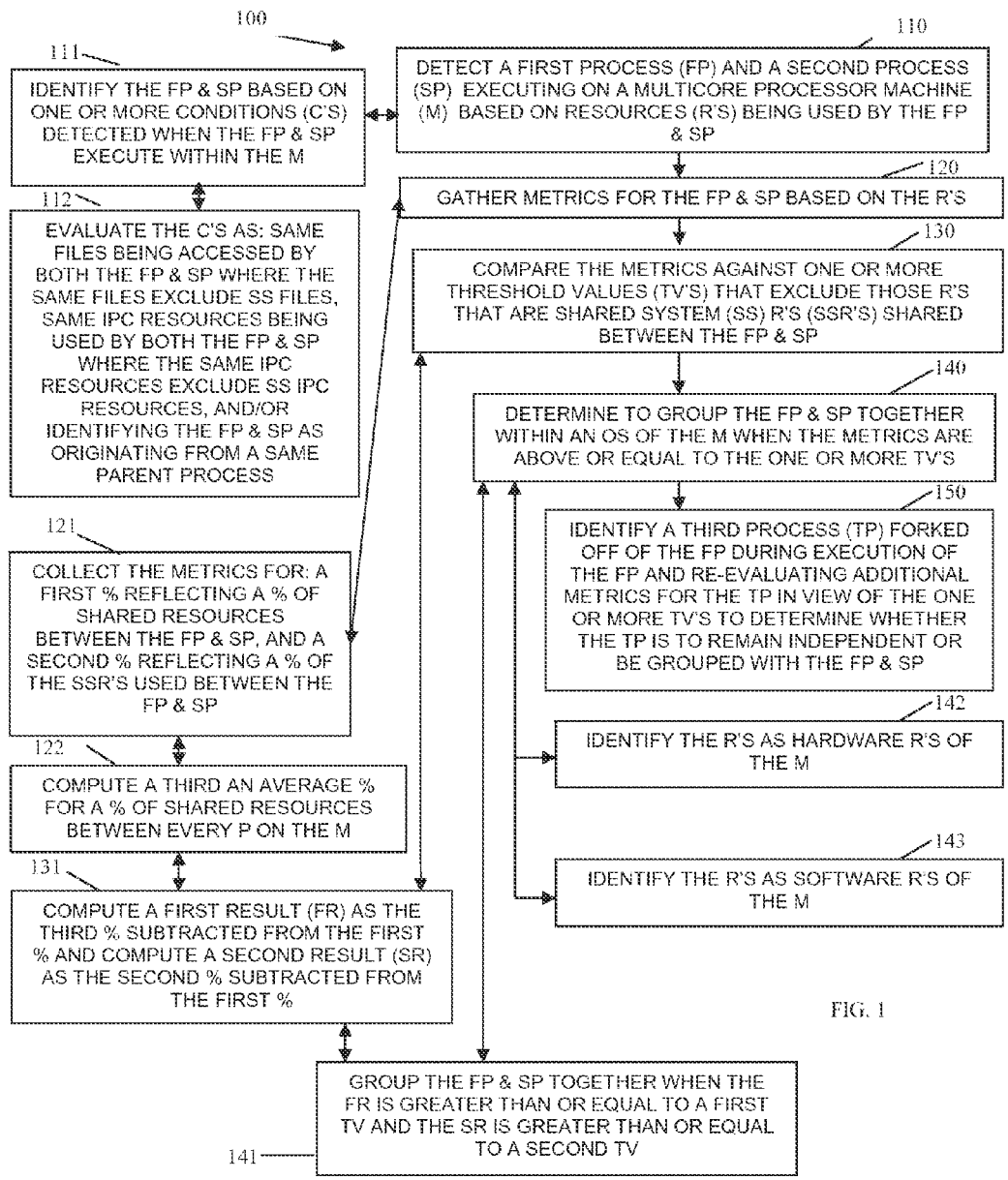
FIG. 1 is a diagram of a method for automatically classifying processes, according to an example embodiment.
Figure 2:
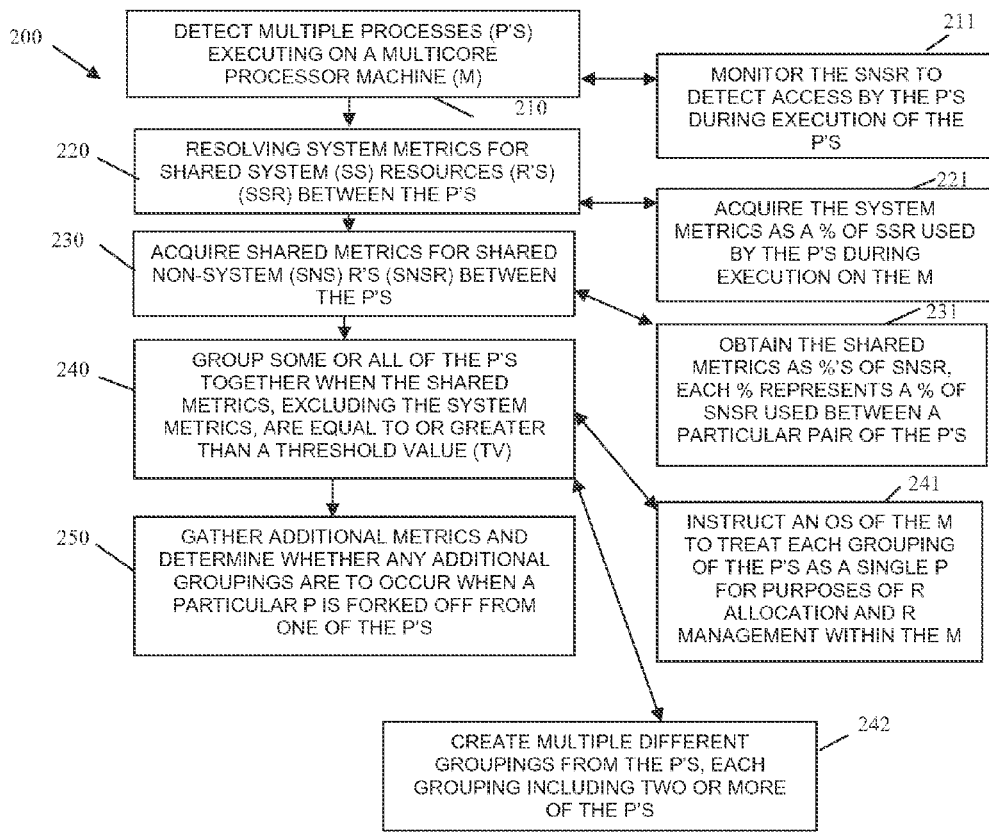
FIG. 2 is a diagram of another method for automatically classifying processes, according to an example embodiment.
Figure 3:
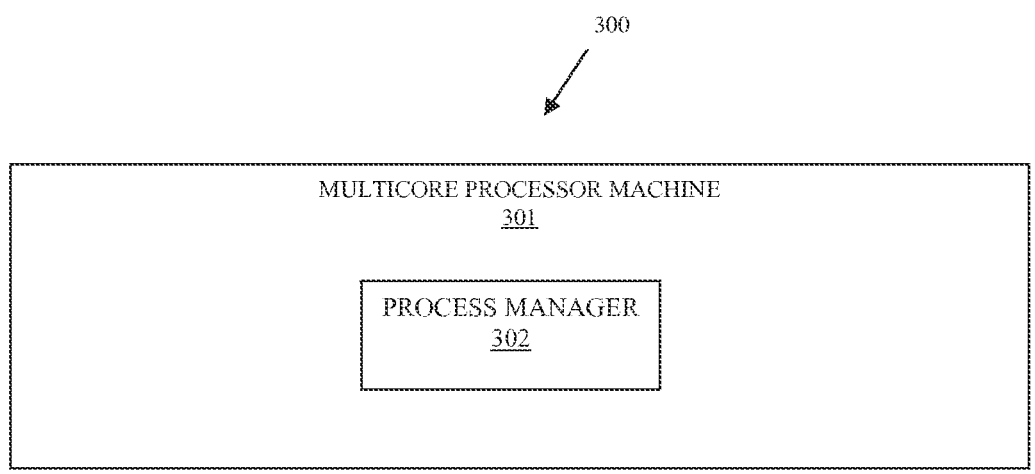
FIG. 3 is a diagram of automatic process classification system, according to an example embodiment.

It is within this context that embodiments of the invention are now discussed within the context of FIGS. 1-3.

FIG. 1 is a diagram of a method 100 for automatically classifying processes, according to an example embodiment. The method 100 (hereinafter "grouping service") is implemented in a machine-accessible and non-transitory computer-readable medium as instructions that execute on one or more processors and are programmed within the one or more processors (machines, computers, processors, etc.), The machines are specifically configured and programmed to process the grouping service. Furthermore, the grouping service can be operational over and process within a network WA). Any such network may be wired, wireless, or a combination of wired and wireless.

In an embodiment, the grouping service is implemented as part of a kernel for an operating system that executes on a multicore processor machine.

In another case, the grouping service is implemented as a daemon or stand alone plug in application to the operating system of the multicore processor machine.

At 110, the grouping service detects a first process and a second process executing on a multicore processor machine. Detection is based on heuristics that account for resources that are being used by both the first process and the second processor. The heuristics can be defined as conditions that the grouping service dynamically evaluates and resolves.

For example, at 111, the grouping service identifies the first process and the second process based on one or more conditions, where those conditions are dynamically detected when and while the first and second processes are executing within the multicore processor machine.

Continuing with the embodiment of 111 and at 112, the grouping service dynamically evaluates the conditions as: same files that are being accessed by both the first process and the second process during their executions where the same files specifically exclude any shared system files used between the first process and the second process; same Inter-Process Communication (IPC) resources being used by both the first process and the second process during their executions where the same IPC resources specifically exclude any shared system IPC resources; and/or identifying the first process and the second process as originating from a same parent process. It is noted that multiple different combinations of the conditions can be required and what specific level of successfully evaluated conditions, which is required can be defined via a policy for the grouping service to automatically and dynamically resolve.

At 120, the grouping service gathers metrics for the first process and the second process based on the resources. That is, processing metrics associated with common resources used between the first and second processes are obtained. This is done to determine whether the first and second processes are to be grouped or classified together as a single logical resource for the operating system of the multicore processor machine.

According to an embodiment, at 121, the grouping service collects the metrics for a first percentage that reflects a percentage of shared resources being used between the first and second processes. The grouping service also collects the metrics for a second percentage that reflects a percentage of shared system resources being used between the first and second processes.

Continuing with the embodiment of 121 and at 122, the grouping service computes a third % for an average % of shared resources between every process on the multicore processor machine.

An example of the embodiments 120-122 is presented below after the discussion of the FIG. 1. Moreover, the processing at 120 feeds the processing at 131 and 141 (which is discussed below after the discussion of the processing at 130 and 140, respectively).

At 130, the grouping service compares the metrics against one or more threshold values where those resources that are shared system resources are excluded. That is, any shared system resources that are shared between the first process and the second process are specifically excluded when the comparison is made.

Now, continuing with the embodiment of 122 and at 131, the grouping service computes a first result as the third percentage subtracted from the first percentage. Additionally, the grouping service computes a second result as the second percentage subtracted from the first percentage. This processing is also more fully described in an example illustration below after the discussion of the FIG. 1 and also with the processing at 141 (and after the processing at 140 is discussed).

At 140, the grouping service determines to group the first process and the second process together within an operating system (OS) of the multicore processor machine when the metrics are above or equal to the threshold values.

Continuing with the embodiment of 131 and at 141, the grouping service groups the first process and the second process together when the first result is greater than or equal to a first threshold value and the second result is also greater than or equal to a second threshold value. Again, an example illustration of the processing defined in 120-141 is presented below after the discussion of the processing elements of the FIG.

In an embodiment, at 142, the grouping service identifies or recognizes the resources as being shared hardware resources of the multicore processor machine.

In another case, at 143, the grouping service identifies or recognizes the resources as being shared software resources of the multicore processor machine.

It is also noted that the embodiments of 142 and 143 are not mutually exclusive, such that some resources can be shared hardware resources while other resources are shared software resources.

According to an embodiment, at 150, the grouping service identifies a third process that is forked off of or spawned from the first process. In response to this situation, the grouping service re-evaluates additional metrics gathered for the third process in view of the one or more threshold values for purposes of determining whether the third process is to remain an independent process or is to be grouped with the first and second processes. In other words, a forked child process is not automatically assumed to be grouped with a parent process that forks the child process off.

Now, an example illustration is presented for purposes of better comprehending the processing associated with the FIG. 1 and in particular the processing associated with 120-141.

It is noted that the example discusses three processes whereas the FIG. 1 was discussed within the context of two processes. The embodiments of the grouping service are not restricted to two processes and in fact any integer number of "N" processes can be simultaneous evaluated for purposes of grouping within the operating system of a multicore processor machine.

Suppose that there are three processes that are executing on a multicore processor machine, identified as: P1, P2, and P3. SSP refers to the percentage of shared system resources for all three of these processes (P1, P2, and P3). PSP(X,Y) refers to a function that takes to processes, identified via the variables X and Y, and returns a percentage for shared resources between the two processes. APSP is a calculation to determine an average percentage for shared resources for all three processes (P1, P2, and P3).

T1 is a percentage threshold for which a pair of processes and their shared resources is to be compared with. T2 is a percentage for which a pair of processes versus all processes having shared resources is compared with.

A sample calculation for dynamically and automatically grouping any two processes (x and Y) then becomes:

If ((PSP(X,Y)−ASAP)>T1) AND ((PSP(X,Y)−SSP)>T2) THEN group X and Y otherwise do not group X and Y.

Now suppose the following metrics are gathered:
PSP(P1,P2)=20%
PSP(P2,P3)=80%
PSP(P1,P3)=30%
SSP=10%
T1=20
T2=40

The ASAP is calculated as (20%+80% 30%)13=43.3%.

Using the sample formula above to determine which of the processes to group reveals that only P2 and P3 should be grouped together because:

For P1 and P2: 20 (PSP(P1,P2))−43.3(ASAP)=−23.3, which is not greater than 20 (T1). Moreover, 20 (PSP(P1,P2))−10 (SSP)=10, which is not greater than 40 (T2). So, P1 and P2 are not grouped together.

For P2 and P3: 80 (PSP(P2,P3))−43.3 (ASAP)=36.7, which is greater than 20 (T1) and 80 (PSP(P2,P3))−10 (SSP)= 70, which is greater than 40 (T2). So, P2 and P3 are grouped together.

For P1 and P3: 30 (PSP(P1,P3))−43.3 (ASAP)=13.3, which is not greater than 20 (T1). Moreover, 30 (PSP(P1,P3))−10 (SSP)=20, which is not greater than 40 (T2). So, P1 and P3 are not grouped together.

It is noted that the example comparisons used checked to see if values were greater than the thresholds whereas FIG. 1 discussed whether the values were greater than or equal to the thresholds. Either scenario can be used and configured into the grouping service or passed as a runtime parameter to the grouping service.

FIG. 2 is a diagram of another method 200 for automatically classifying processes, according to an example embodiment. The method 100 (hereinafter "classification service") is implemented in a machine-accessible and non-transitory computer-readable medium as instructions that execute on one or more processors and are programmed on the one or more processors (machines, computers, processors, etc.). The machine is specifically configured and programmed to process the classification service. Furthermore, the principal's classification service can be operational over and process within a network. Any such network may be wired, wireless, or a combination of wired and wireless. In an embodiment, the network is the Internet.

The classification service presents another and in some cases an enhanced perspective of the grouping service represented by the method 100 of the FIG. 1.

At 210, the classification service detects multiple processes executing on a multicore processor machine.

According to an embodiment, at 211, the classification service monitors shared non-system resources to detect access by the multiple processes during execution of the multiple processes. One way to achieve this is to inspect a log that the classification service has access to and that writes an identity for a process each time that process accesses a resource along with an identity for the resource. The log file can be inspected to determine that multiple processes are accessing the same resources. Other techniques can be used as well.

At 220, the classification service resolves system metrics for shared system resources between the multiple processes.

So, in one case, at 221, the classification service acquires the system metrics as a percentage of shared system resources used by the multiple processes during execution on the multicore processor machine. An example illustration of this scenario was presented above with the discussion of the FIG. 1 and in the example following the discussion of the FIG. 1.

At 230, the classification service acquires shared metrics for shared non-system resources between the multiple processes.

In one situation, at 231, the classification service obtains the shared metrics as a percentage of shared non-system resources; each percentage represents a percentage of shared non-system resources used between a particular pair of the multiple processes. Again, details of this scenario were provided in detail above with the discussion of the FIG. 1 and the example that immediately followed the discussion of the FIG. 1.

At 240, the classification service groups some or the entire multiple processes together when the shared metrics, excluding the system metrics, are equal to or greater than a threshold value. Again, in some configurations, the check against the threshold value is just whether the shared metrics, excluding the system metrics, are greater than the threshold value.

According to an embodiment, at 241, the classification service instructs an operating system of the multicore processor machine to treat each grouping of the multiple processes as a single logical process for purposes of resource allocation and resource management.

In an embodiment, at 242, the classification service creates multiple different groupings from the multiple processes where each grouping includes two or more of the processes grouped together. Moreover, each process that is grouped belongs to just one group.

In another case, at 250, the classification service gathers additional metrics and determines whether any additional groupings are to occur when a particular process is forked off of or spawned from one of the multiple processes. So, here again, there does not have to always be an assumption that a forked child process is automatically grouped with the parent process from which it was spawned.

FIG. 3 is a diagram of an automatic process classification system 300, according to an example embodiment. The automatic process classification system 300 is implemented within a multicore processor machine. The machine is specifically configured and programmed to process other aspects of the automatic process classification system 300. Furthermore, the automatic process classification system 300 can be operational over and process within a network. Any such network may be wired, wireless, or a combination of wired and wireless. In an embodiment, the network is the Internet.

In an embodiment, the automatic process classification system 300 implements, inter alia, the methods 100 and 200 of the FIGS. 1 and 2, respectively.

The automatic process classification system 300 includes a multicore processor machine 301 and a process manager 302. Each of these components and their interactions with one another will now be described below in turn.

The multicore processor machine 301 includes multiple processors and an operating system executing on the multicore processor machine 301.

The multicore processor machine 301 is configured with and programmed with the processor manager 302. That is, the processor manager 302 is implemented and programmed within a non-transitory computer-readable storage medium and the multicore processor machine 301 is configured to execute the process manager 302 on the multicore processor machine's 301 multiple processors, Example aspects of the process manager 302 were described in detail above with reference to the methods 100 and 200 of the FIGS. 1 and 2, respectively.

The process manager 302 is configured to identify groupings of processes executing within the operating system based on shared resources detected for each grouping and excluding shared system resources detected within each grouping. This processing was described above in detail with respect to the methods 100 and 200 of the FIGS. 1 and 2, respectively, According to an embodiment, the process manager 302 is also configured to instruct the operating system to treat each grouping as a single resource for purposes of resource management and resource allocation.

In another embodiment, the process manager 302 is further configured to identify groupings based on collection and evaluation of metrics in view of one or more predefined threshold values. This too was described in detail above with reference to the methods 100 and 200 of the FIGS. 1 and 2, respectively.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
    detecting, on one or more processors, a first process and a second process based on resources being used by both the first process and the second process;
    gathering, on the one or more processors and in response to detecting the first and second processes, metrics for resources used by the first process and the second process in a multicore processing architecture;
    collecting, on the one or more processors and in response to gathering the metrics, the metrics for each of the resources as a percentage of that resource being consumed by the first process and the second process;
    comparing, on the one or more processors and in response to the collecting of the metrics, each percentage against one or more threshold values that exclude the resources shared between the first and second processes from the resources for which the metrics are gathered to assist in determining whether to group the first and second processes together within the multicore architecture;
    grouping, on the one or more processors and in response to the comparing each percentage, the first process and the second process together based on the metrics evaluated for usage of the resources by the first and second processes within the multicore processing architecture when the metrics are above or equal to the one or more threshold values; and
    re-gathering, on the one or more processors, the metrics when a third process is detected as being forked off or spawned from either the first process or the second process in view of the one or more threshold values for purposes of determining whether the third process is to remain an independent process or is to be grouped with the first and second processes.

2. The method of claim 1, wherein gathering further includes identifying the multicore architecture as a cloud processing environment.

3. The method of claim 1, wherein gathering further includes evaluating heuristics to dynamically determine types of the metrics to gather.

4. The method of claim 3, wherein evaluating further includes using conditions defined in the heuristics that are dynamically resolved while the first and second processes are executing in the multicore architecture.

5. The method of claim 1, wherein grouping further includes treating the first and second processes as a single logical resource within the multicore architecture once grouped together.

6. The method of claim 1 further comprising, processing, via the one or more processors, the method within a kernel of an operating system used for the multicore architecture.

7. The method of claim 1 further comprising, processing, via the one or more processors, the method as a plug-in application to an operating system used for the multicore architecture.

8. A method, comprising:
    detecting, via one or more processors, a set of processes executing within a cloud processing environment;
    selectively collecting, via the one or more processors and in response to detecting the set of processes, metrics for resources used by the set of processes executing within the cloud processing environment;
    collecting, on the one or more processors and in response to gathering the metrics, the metrics for each of the resources as a percentage of that resource being consumed by the set of processes;
    comparing, on the one or more processors and in response to the collecting of the metrics, each percentage against one or more threshold values that exclude the resources shared between the set of processes from the resources for which the metrics are gathered to assist in determining whether to group the set of processes together within the cloud processing environment; grouping, via the one or more processors and in response to the comparing each percentage, all or some of the processes into one or more groups when the metrics are above or equal to the one or more threshold values;
    gathering, on the one or more processors, additional metrics and determines whether any additional groupings are to occur when a particular process is forked off of or spawned from one of the set of processes in view of the one or more threshold values for purposes of determining whether the particular process is to remain an independent process or is to be grouped with the set of processes, and
    logically treating, via the one or more processors, each group as a single logical process within the cloud processing environment.

9. The method of claim 8, wherein selectively collecting further includes excluding shared system resources from the resources for which the metrics are collected.

10. The method of claim 8, wherein selectively collecting further includes dynamically evaluating conditions associated with the set of processes and the resources to selectively collect the metrics.

11. The method of claim 8, wherein selectively collecting further includes evaluating log files associated with the resources to gather at least some of the metrics.

12. The method of claim 8, wherein grouping further includes creating a single group.

13. The method of claim 8, wherein grouping further includes creating two or more groups.

14. A multi-processor implemented system, comprising:
    multiple processors representing a cloud processing environment having a multicore architecture with an operating system executing thereon; and
    a memory having a processor manager that executes on the multiple processors;
    the processor manager configured to selective group a set of processes that execute in the cloud processing environment based on usage of shared resources, wherein each group created is treated as a single logical process within the cloud processing environment;
    detecting, via the multiple processors, the set of processes executing within the cloud processing environment;
    selectively collecting, via the multiple processors and in response to detecting the set of processes, metrics for resources used by the set of processes executing within the cloud processing environment;
    collecting, on the multiple processors and in response to gathering the metrics, the metrics for each of the resources as a percentage of that resource being consumed by the set of processes;
    comparing, on the multiple processors and in response to the collecting of the metrics, each percentage against one or more threshold values that exclude the resources shared between the set of processes from the resources for which the metrics are gathered to assist in determining whether to group the set of processes together within the cloud processing environment;

grouping, via the multiple processors and in response to the comparing each percentage, all or some of the processes into one or more groups when the metrics are above or equal to the one or more threshold values; and gathering, on the multiple processors, additional metrics and determines whether any additional groupings are to occur when a particular process is forked off of or spawned from one of the set of processes in view of the one or more threshold values for purposes of determining whether the particular process is to remain an independent process or is to be grouped with the set of processes.

15. The system of claim 14, wherein the processor manager is configured to exclude shared system resources from the shared resources.

16. The system of claim 14, wherein the process manager is configured to dynamical determine types of metrics to gather to determine the usage of the shared resources by the set of processes.

* * * * *